United States Patent
Kuerzl et al.

(10) Patent No.: US 11,230,146 B2
(45) Date of Patent: Jan. 25, 2022

(54) METHOD, CONTROL DEVICE, AND SYSTEM FOR DETERMINING A PROFILE DEPTH OF A PROFILE OF A TYRE

(71) Applicant: Continental Automotive GmbH, Hannover (DE)

(72) Inventors: Alexander Kuerzl, Hannover (DE); Matthias Kretschmann, Hannover (DE); Michael Löffler, Hannover (DE)

(73) Assignee: Continental Automotive GmbH

( * ) Notice: Subject to any disclaimer, the term of this patent is extended or adjusted under 35 U.S.C. 154(b) by 42 days.

(21) Appl. No.: 16/496,297

(22) PCT Filed: Mar. 20, 2018

(86) PCT No.: PCT/EP2018/056946
§ 371 (c)(1),
(2) Date: Sep. 20, 2019

(87) PCT Pub. No.: WO2018/172317
PCT Pub. Date: Sep. 27, 2018

(65) Prior Publication Data
US 2020/0070589 A1    Mar. 5, 2020

(30) Foreign Application Priority Data
Mar. 21, 2017   (DE) .................... 10 2017 204 648.1

(51) Int. Cl.
*B60C 11/24*    (2006.01)
(52) U.S. Cl.
CPC .......... *B60C 11/243* (2013.01); *B60C 11/246* (2013.01)
(58) Field of Classification Search
None
See application file for complete search history.

(56) References Cited

U.S. PATENT DOCUMENTS

| | | | |
|---|---|---|---|
| 6,327,904 B1 | 12/2001 | Oldenettel | |
| 2010/0295669 A1* | 11/2010 | Pannek | B60C 11/24 340/438 |

(Continued)

FOREIGN PATENT DOCUMENTS

| | | |
|---|---|---|
| CN | 104602924 A | 5/2015 |
| CN | 105313606 A | 2/2016 |

(Continued)

OTHER PUBLICATIONS

International Search Report and Written Opinion dated Jun. 15, 2018 from corresponding International Patent Application No. PCT/EP2018/056946.

(Continued)

*Primary Examiner* — Paul M. West
*Assistant Examiner* — Mark A Shabman

(57) ABSTRACT

A method for determining a tread depth of a tread of a tire during operation of a vehicle comprising the tire, a controller for a vehicle for determining a tread depth of a tread of a tire of the vehicle, and a system for a vehicle, comprising such a controller and at least one electronic wheel unit, wherein there is provision to determine the tread depth based on a determined instantaneous dynamic wheel radius of a wheel, comprising the tire, of the vehicle and a determined instantaneous dynamic inside radius of the tire are disclosed. To improve the accuracy of determination of the tread depth a correction variable predetermined for the type of tire is taken into consideration, which correction variable characterizes the relationship between a change in the tread depth, and a change resulting therefrom in the difference between the dynamic wheel radius and the dynamic inside radius.

13 Claims, 4 Drawing Sheets

(56) References Cited

U.S. PATENT DOCUMENTS

Figure 1:
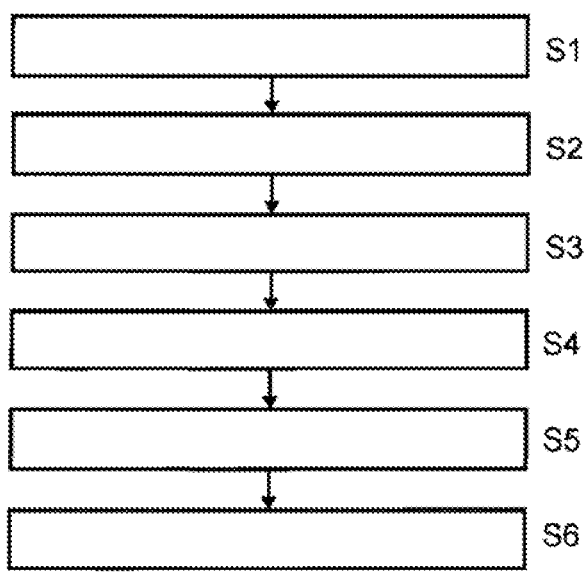

2015/0174967 A1    6/2015  Lehmann et al.
2015/0239298 A1*  8/2015  Kretschmann ........ B60C 11/246
                                                                   701/33.7

FOREIGN PATENT DOCUMENTS

| DE | 19716586 C1 | 8/1998 |
| --- | --- | --- |
| DE | 10058099 A1 | 5/2002 |
| DE | 102012217901 B3 | 5/2014 |
| DE | 102013208190 A1 | 11/2014 |
| DE | 102015220097 A1 | 4/2017 |
| WO | 2014/053322 A1 | 4/2014 |

OTHER PUBLICATIONS

Office Action dated Nov. 27, 2017 from corresponding German Patent Application No. DE 10 2017 204 648.1.

* cited by examiner

METHOD, CONTROL DEVICE, AND SYSTEM FOR DETERMINING A PROFILE DEPTH OF A PROFILE OF A TYRE

Method, control device, and system for determining a profile depth of a profile of a tyre The present invention relates to a method for determining a tread depth of a tread of a tire during operation of a vehicle having the tire, a controller for a vehicle for determining a tread depth of a tread of a tire of the vehicle and a system for a vehicle, having such a controller and at least one electronic wheel unit.

DE 10 2012 217 901 133 discloses a method for determining a tread depth of a tread of a tire during operation of a vehicle having the tire, which method has the following steps:
- determining an instantaneous rotational speed of a wheel, having the tire, of the vehicle based on data determined by at least one first sensor,
- determining an instantaneous speed of the vehicle based on data determined by at least one second sensor different from the at least one first sensor,
- determining an instantaneous dynamic wheel radius of the wheel having the tire based on the determined instantaneous rotational speed and the determined instantaneous speed,
- determining at least one first operating parameter of the tire, selected from the group consisting of an instantaneous tire temperature, an instantaneous tire pressure and an instantaneous tire load,
- determining an instantaneous dynamic inside radius of the wheel based on the at least one determined first operating parameter, wherein the inside radius of the wheel is the distance between the wheel center and the tire-side start of the tread,
- determining a tread depth of the tread of the tire based on the determined instantaneous dynamic wheel radius and the determined instantaneous dynamic inside radius.

DE 10 2012 217 901 B3 thus proposes to determine the tread depth as the difference between the dynamic wheel radius and the dynamic inside radius.

It is clear that this method functions well whenever the tire in question largely maintains its circular shape in spite of a wheel load or tire load acting thereon, that is to say the so-called tire footprint is relatively small, which tends to be more or less correct for example in the case of high tire pressure and/or low tire load.

The inventors of the present invention have however additionally considered that, in practice, the difference between a geometric wheel radius and a geometric inside radius is considered to be the tread depth of a tire, that is to say the radii that are completely independent of tire operation on a vehicle and that are measured on a tire (for example removed from the vehicle). The dynamic radii (dynamic wheel radius and dynamic inside radius) during operation of the tire however deviate therefrom to a greater or lesser extent, such that the already known determination of the tread depth as a difference between the dynamic (and non-geometric) radii is only able to constitute an approximation.

One object of the present invention is therefore to improve the determination of the tread depth as explained above with regard to the accuracy of the determination result.

A first aspect of the invention relates to a method for determining a tread depth of a tread of a tire during operation of a vehicle having the tire, wherein the method has the following steps:
- determining an instantaneous rotational speed of a wheel, having the tire, of the vehicle based on data determined by at least one first sensor,
- determining an instantaneous speed of the vehicle based on data determined by at least one second sensor different from the at least one first sensor,
- determining an instantaneous dynamic wheel radius of the wheel having the tire based on the determined instantaneous rotational speed and the determined instantaneous speed of the vehicle,
- determining at least one first operating parameter of the tire, selected from the group consisting of an instantaneous tire temperature, an instantaneous tire pressure and an instantaneous tire load,
- determining an instantaneous dynamic inside radius of the wheel based on the at least one determined first operating parameter, wherein the inside radius of the wheel is the distance between the wheel center and the tire-side start of the tread,
- determining a tread depth of the tread of the tire based on the determined instantaneous dynamic wheel radius and the determined instantaneous dynamic inside radius.

The tread depth is determined in this case taking into consideration a correction variable determined beforehand for the type of tire, wherein the correction variable characterizes the relationship between a change in the tread depth, on the one hand, and a change resulting therefrom in the difference between the dynamic wheel radius and the dynamic inside radius, on the other hand.

It has proven that, by taking into account such a correction variable dependent at least on the type of tire, it is advantageously possible to determine the tread depth with improved accuracy.

To determine this correction variable beforehand, a specimen of the tire in question may for example be operated on a test bench under controlled operating conditions and in particular controlled variation of operating parameters, including the tread depth, and it may in the process be measured in order to determine the correction variable as a result of this measurement.

The correction variable constitutes a parameter within the context of the invention, by way of which a correlation between the abovementioned dynamic radii and geometric radii is established or beneficially.

In one embodiment that is particularly easy to implement, a correction constant characteristic for the type of tire is used as the correction variable, which correction constant represents the relationship between the change in the tread depth, on the one hand, and the change resulting therefrom in the difference between the dynamic wheel radius and the dynamic inside radius, on the other hand.

As is explained in even more detail below, a correction constant may in particular advantageously be used in this case that is nominally greater than 1 and is for example at least 1.5, in particular at least 2 (depending on the type of tire). On the other hand, it is generally expedient if the correction constant is at most 8, in particular at most 5.

If such a correction constant is used as the correction variable, then, when determining the tread depth taking into consideration the correction constant, any change in the difference between the dynamic wheel radius and the dynamic inside radius may be mapped (mathematically) onto a corresponding change in the tread depth.

The mapping, that is to say mathematical function, in this case constitutes a linear function in that a change in the difference between the dynamic wheel radius and the dynamic inside radius multiplied by the correction constant gives the associated change in the tread depth.

It is pointed out at this juncture that, very generally in the context of the invention, determining a change in the tread depth is synonymous with determining the tread depth insofar as the instantaneous tread depth is given from each (subsequent) tread depth change due to the knowledge of an initial tread depth (as initial tread depth minus tread depth change).

The initial tread depth (for example the tread depth of a new tire or for example, in the case of installation of a used tire, a measured tread depth) may be stored in particular in a memory device of a system used to perform the method (for example in a controller of the vehicle or in an electronic wheel unit on the tire in question).

Unlike in the present invention, DE 10 2012 217 901 B3 uses an approximation in which the tread depth is considered to be identical to the difference between the dynamic wheel radius and the dynamic inside radius, independently of the specific type of tire. According to the invention, a more accurate relationship is however able to be determined individually for each type of tire and thus advantageously taken into account in order to improve the determination accuracy.

In one embodiment suitable for further increasing the determination accuracy, a correction function, characteristic for the type of tire, for mapping a difference between the dynamic wheel radius and the dynamic inside radius onto a change in the tread depth is used as the correction variable.

Therefore, mapping that is even better adjusted to the type of tire in question of a difference between the dynamic wheel radius and the dynamic inside radius onto a change in the tread depth may also advantageously be carried out, for example in a manner deviating from the explained consideration of a correction constant or the use of a linear function.

In one development, there is provision for the correction function to additionally depend on at least one function parameter, selected from the group consisting of the speed of the vehicle, the tire temperature, the tire pressure and the tire load.

As an alternative or in addition, there may for example be provision for the function value to additionally depend on the dynamic wheel radius and/or the dynamic inside radius (and thus not necessarily only on the difference between these two variables).

To achieve the latter embodiments, it is expedient, in the already mentioned measurement of a specimen of a particular type of tire and/or a measurement of a plurality of specimens of the same type but with a different tread depth on a test bench, to vary one or more parameters in a controlled manner, especially those that are provided as function parameters of the correction function. Based on the result of such a measurement, it is then possible to define the required correction function, for example by way of a mathematical fit, wherein the correction function may in particular be defined by one or more characteristic curves (or a lookup table).

Accordingly, there is provision in one exemplary embodiment for the tread depth to be determined by way of at least one characteristic curve stored in a memory device.

The at least one characteristic curve may characterize in particular for example a relationship between a change in the tread depth (or the tread depth itself) and other variables determined in the context of the method, in particular for example the difference between the dynamic wheel radius and the dynamic inside radius. There is preferably provision for a multiplicity of characteristic curves or a characteristic curve diagram that is able to be used when determining the change in the tread depth (or the tread depth itself) in the manner of a lookup table, in order to read the tread depth change (or the tread depth) based on the values of the previously determined variables in question.

In one embodiment, there is provision for at least one second operating parameter to be additionally determined, which second operating parameter is selected from the group consisting of an instantaneous acceleration of the vehicle, an instantaneous yaw rate of the vehicle, an instantaneous steering angle, an instantaneous torque of a drive motor of the vehicle and an operating state of a braking device of the vehicle, wherein the tread depth is additionally determined depending on the at least one determined second operating parameter.

By considering at least one such second operating parameter, it is possible for example to further improve the accuracy of the tread depth determination. As an alternative, the determination of at least one such second operating parameter may also however be used to detect an operating situation that is unfavorable to the tread depth determination (for example an excessively great acceleration of the vehicle, etc.) and, in such situations, to defer the tread depth determination until a more favorable operating situation is reached again or to identify the values of the tread depth that are determined during the unfavorable situation for example as inaccurate and/or invalid.

In one embodiment, the at least one first sensor is designed as a rotational speed sensor.

The rotational speed of the wheel is able to be determined easily and reliably using a rotational speed sensor. By way of example, rotational speed sensors able to be used for this purpose are advantageously generally provided in any case in modern motor vehicles, for example for the purpose of operating safety and comfort systems such as for example an anti-lock braking system (ABS) or an electronic stability program (ESP).

In one embodiment, the at least one second sensor selected from the group consisting of a satellite-assisted position determination sensor, a radar sensor, a lidar sensor, an ultra-sound sensor and an optical camera.

At least one such sensor is often also present in any case for example in modern vehicles, as a result of which this is advantageously able to be jointly used in the context of the invention.

With regard to the determination, provided in the method according to the invention, of the instantaneous dynamic inside radius (based on the at least one determined first operating parameter), according to a further embodiment, there may thus be provision to first of all determine (whether even before or for example at the beginning of the performance of the actual method) a base value for the dynamic inside radius in the case of a known new tire having a defined tread depth ("new tire tread depth") under predetermined normal conditions of the tire operation, and to then store this base value, determined in this way (at the start of the tire life as it were), of the dynamic inside radius for the rest of the tire life in a storage device of a system used to perform the method.

This base value may in particular in this case for example be determined as the difference between the dynamic wheel radius and the tread depth (of the tire with the defined tread depth, in particular of the new tire, under the normal conditions).

The base value determined in such a way may be used during the further operation of the vehicle, for example advantageously as an approximation value for the instantaneous dynamic inside radius of the wheel, which is however corrected further when the instantaneous dynamic inside radius of the wheel is determined based on the at least one determined first operating parameter (wherein the first operating parameter or operating parameters specify as it were a corresponding match with or deviation from the normal conditions).

In one embodiment, there is provision for the instantaneous dynamic inside radius to additionally be determined based on the determined instantaneous speed of the vehicle and/or additionally be determined based on the type of tire and/or an age of the tire.

Said parameters may likewise have an influence on the inside radius of the wheel, as a result of which, by taking these into account as well, the accuracy of the inside radius determination and therefore also of the tread depth determination is advantageously able to be improved.

In one embodiment, the instantaneous dynamic inside radius is determined by way of at least one characteristic curve stored in a memory device.

The at least one characteristic curve may in particular characterize a relationship between the dynamic inside radius and the at least one first operating parameter of the wheel. There is preferably provision for a multiplicity of characteristic curves or a characteristic curve diagram that is able to be used when determining the inside radius in the manner of a lookup table.

A second aspect of the invention relates to a controller for a vehicle for determining a tread depth of a tread of a tire of the vehicle, having
- a reception device, designed to receive an instantaneous rotational speed of a wheel, having the tire, of the vehicle, an instantaneous speed of the vehicle and at least one first operating parameter of the tire, selected from the group consisting of an instantaneous tire temperature, an instantaneous tire pressure and an instantaneous tire load,
- a first determination device, designed to determine an instantaneous dynamic wheel radius of the wheel having the tire based on the received instantaneous rotational speed and the received instantaneous speed of the vehicle,
- a second determination device, designed to determine an instantaneous dynamic inside radius of the wheel based on the at least one received first operating parameter, wherein the inside radius of the wheel is the distance between the wheel center and the tire-side start of the tread, and
- a third determination device, designed to determine a tread depth of the tread of the tire based on the determined instantaneous dynamic wheel radius and the determined instantaneous dynamic inside radius.

The third determination device is in this case designed to determine the tread depth taking into consideration a correction variable determined beforehand for the type of tire, wherein the correction variable characterizes the relationship between a change in the tread depth, on the one hand, and a change resulting therefrom in the difference between the dynamic wheel radius and the dynamic inside radius, on the other hand.

The controller may be designed for example as a stand-alone device for the purpose of determining the tread depth at at least one, preferably a plurality of, or all of the tires of the vehicle. As an alternative, the controller may constitute a component or a partial functionality of a controller of the vehicle that additionally also serves for other purposes (for example a central controller of the vehicle, a controller of an anti-lock braking system or of a driving dynamics control system, etc.).

According to a further aspect of the invention, a system for a vehicle for determining a tread depth of a tread of a tire of the vehicle is proposed, having a controller of the type described here and at least one electronic wheel unit, wherein the at least one electronic wheel unit is able to be arranged in the tire and has at least one sensor selected from the group consisting of a temperature sensor, a pressure sensor, an acceleration sensor (including an impact sensor) and a deformation sensor.

Electronic wheel units able to be used for such a system are available in many configurations, as a result of which it is advantageously possible to resort to these for the specific design.

A further aspect of the invention relates to a computer program product having a program code that, when executed on a data processing device (for example a central controller of the vehicle), performs a method of the type described above.

All of the embodiments and particular configurations described herein in connection with the method according to the invention may also be provided analogously, individually or in any desired combination, as embodiments or particular configurations of the controller according to the invention, of the system described above and of said computer program product.

Figure 2:
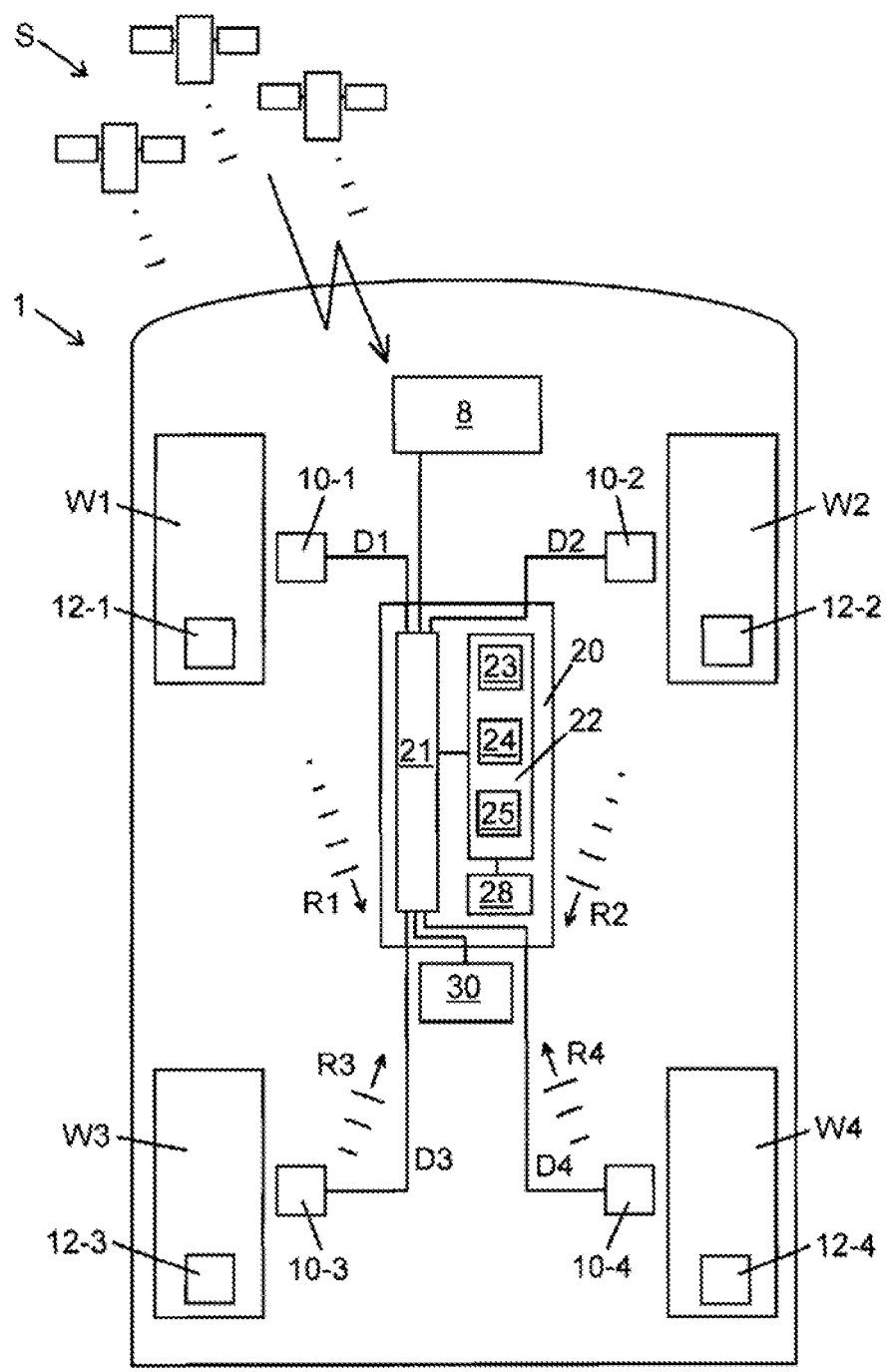
Figure 3:
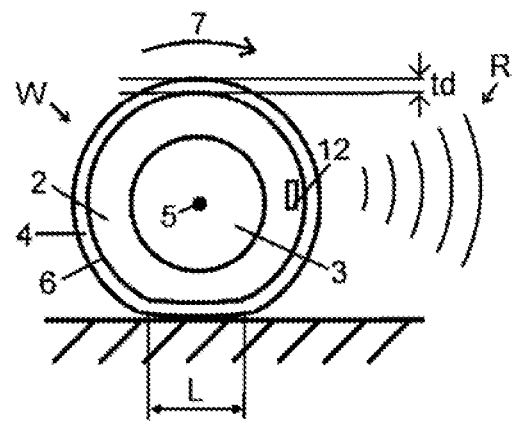
Figure 4:
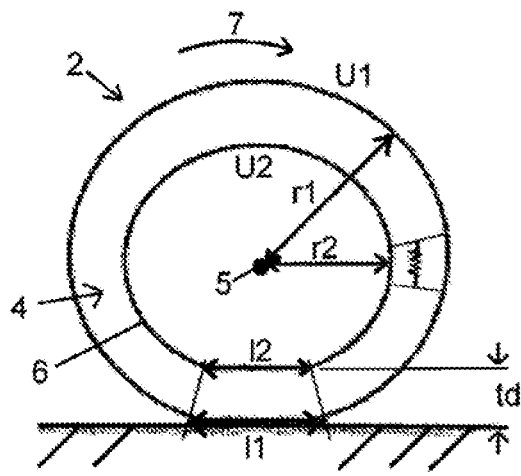
Figure 5:
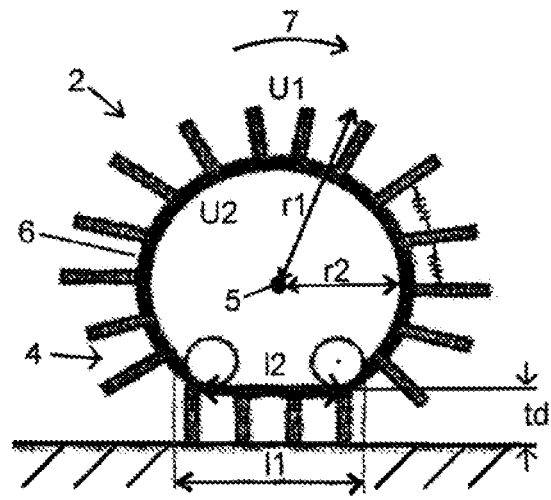
Figure 6:
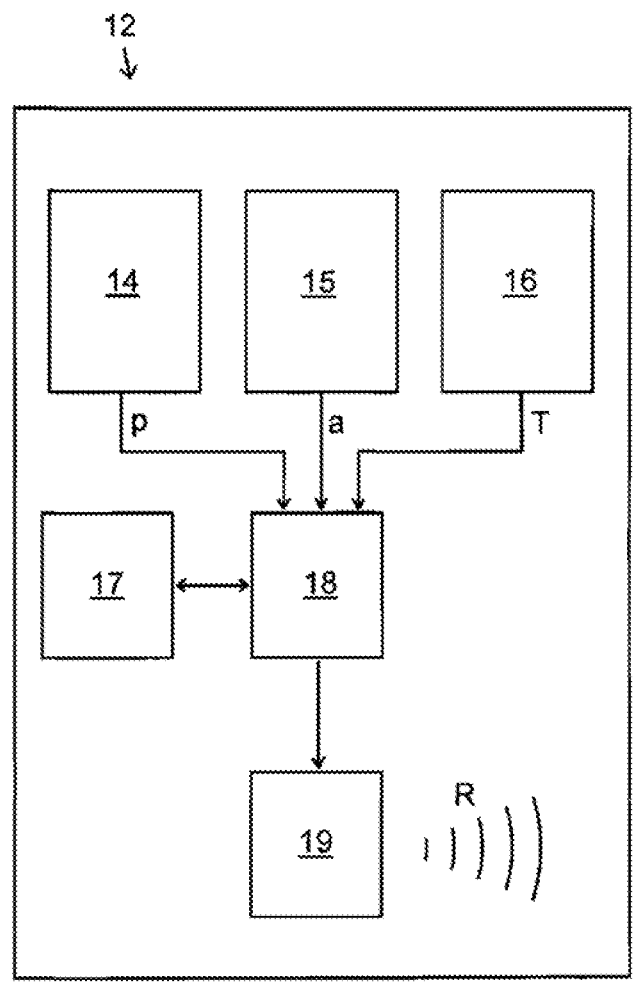

The invention is described in more detail below on the basis of exemplary embodiments with reference to the enclosed drawings, in which:

FIG. 1 shows a flowchart of a method for determining a tread depth of a tread of a tire, FIG. 2 shows a schematic plan view of a vehicle having a system by way of which the method of FIG. 1 is able to be performed, FIG. 3 shows a schematic side view of a wheel of the vehicle of FIG. 2, FIG. 4 shows a schematic side view of a tire of the wheel of FIG. 3 for explaining geometrical relationships according to a tire model in a first limit case, FIG. 5 shows a schematic side view of the tire of the wheel of FIG. 3 for explaining geometrical relationships according to the tire model in a second limit case and FIG. 6 shows a block circuit diagram of an electronic wheel unit used in the system of the vehicle of FIG. 2.

FIG. 1 shows a flowchart of a method for determining a tread depth of a tread of a tire during operation of a vehicle having the tire according to one exemplary embodiment.

In a step S1, as instantaneous rotational speed of a wheel, having the tire, of the vehicle is determined based on data determined by at least one first sensor. By way of example, an instantaneous angular speed $\omega$ of the wheel is determined. The at least one first sensor is to this end preferably designed as a rotational speed sensor.

In a step S2, an instantaneous speed v of the vehicle (vehicle longitudinal speed) is determined based on data determined by at least one second sensor different from the at least one first sensor. Determining the instantaneous speed v typically involves determining a value of a journey covered in a particular time interval by the vehicle based on the data determined by the at least one second sensor. The at least one second sensor is to this end designed for example as a satellite-assisted position determination sensor (for example as a GPS device). The at least one second sensor may furthermore be designed for example as a radar sensor, lidar sensor, ultrasound sensor or optical camera in order thereby for example to determine a distance of the vehicle to objects detected as being stationary at different times and to determine the journey covered by the vehicle therefrom.

In a step S3, an instantaneous dynamic wheel radius $r1_{dyn}$ of the wheel having the tire is determined based on the determined instantaneous rotational speed (here the angular speed ω) and the determined instantaneous vehicle speed v. This is performed in the exemplary embodiment that is shown by way of the relationship $v=r1_{dyn}\times\omega$, wherein, as already mentioned, v denotes the instantaneous speed of the vehicle, $r1_{dyn}$ denotes the instantaneous dynamic wheel radius of the wheel and ω denotes the instantaneous angular speed of the wheel.

In a step S4, at least one first operating parameter of the tire is determined, selected from the group consisting of an instantaneous tire temperature T, an instantaneous tire pressure p and an instantaneous tire load RL. In this case, at least two, in particular all three of said parameters are preferably determined. Said parameters may in particular be determined for example by way of an electronic wheel unit arranged in the tire in question, as is explained in even more detail in connection with the further figures.

In a step S5, an instantaneous dynamic inside radius $r2_{dyn}$ of the wheel is determined based on the at least one determined first operating parameter, wherein the inside radius of the wheel is the distance between the wheel center and the tire-side start of the tread. The instantaneous dynamic inside radius $r2_{dyn}$ may in this case additionally be determined based on the determined instantaneous speed v of the vehicle and/or additionally based on the type of tire and/or an age of the tire, since these parameters also have an influence on the inside radius of the tire that results in an operating situation. The type of tire may (for example together with an initial tread depth) be stored for example in a memory device of an electronic wheel unit in question.

The type of tire or data stored in respect of this may in particular specify for example whether this is a summer tire, winter tire or all-year tire and/or specify whether the tire material is relatively hard or relatively soft (in particular also in quantitative terms) and/or specify a type of the tread.

The type of the tread or data stored in respect of this may in particular specify for example the tread pattern defined by elevations and depressions and/or physical properties of the tread that result therefrom.

The instantaneous dynamic inside radius $r2_{dyn}$ is preferably determined by way of at least one characteristic curve stored in a memory device.

The dynamic inside radius $r2_{dyn}$ of the wheel typically increases with increasing tire temperature T and with increasing tire pressure p, whereas an increasing tire load RL typically leads to a reduction in the dynamic inside radius $r2_{dyn}$. With increasing speed v of the vehicle, the dynamic inside radius $r2_{dyn}$ typically increases, wherein the increase in the inside radius $r2_{dyn}$ typically transitions into a saturation when a particular speed range is reached. Said dependencies may advantageously be determined beforehand for example by a corresponding measurement of a specimen of a tire of the type of tire in question on a test bench in order to determine one or preferably a plurality of characteristic curves or a characteristic curve diagram for the type of tire in question. When performing the method according to the invention during operation of the vehicle, it is possible to then resort to such characteristic curves stored in a memory device when determining the dynamic inside radius $r2_{dyn}$.

In a step S6, a tread depth td of the tread of the tire is determined based on the determined instantaneous dynamic wheel radius $r1_{dyn}$ and the determined instantaneous dynamic inside radius $r2_{dyn}$.

According to the teaching of DE 10 2012 217 901 B3 already mentioned at the outset, this tread depth determination (step S6) would take place based on both of said variables on the basis of the following relationship:

$$td=r1_{dyn}-r2_{dyn}$$

In other words, the tread depth td would thus be determined as the difference between the instantaneous dynamic wheel radius $r1_{dyn}$ and the instantaneous dynamic inside radius $r2_{dyn}$.

Even though this relationship appears to be entirely obvious and yields good results for many types of tire and many operating situations with regard to tire and/or vehicle, it has proven that the tread depth determination based on at least dynamic wheel radius $r1_{dyn}$ and dynamic inside radius $r2_{dyn}$ is able to be further improved by the measure according to the invention according to which the tread depth td is determined taking into consideration a correction variable determined beforehand for the type of tire, wherein the correction variable characterizes the relationship between a change in the tread depth td, on the one hand, and a change resulting therefrom in the difference between the dynamic wheel radius $r1_{dyn}$ and the dynamic inside radius $r2_{dyn}$, on the other hand.

Thus, while according to DE 10 2012 217 901 B3 it is a prerequisite for the tread depth determination for all types of tire that a change in the difference between $r1_{dyn}$ and $r2_{dyn}$ is always synonymous with a change of exactly the same magnitude in td ($\Delta td=\Delta(r1_{dyn}-r2_{dyn})$), according to the invention, in the tread depth determination, use is made of the finding that this relationship does constitute a good approximation, but this approximation does not always yield exact results in particular for particular types of tire and/or in particular operating situations of the tire and/or vehicle.

Advantageously, the invention is able to at least partly compensate a more or less large systematic error in the tread depth determination by way of taking into account, as mentioned, the correction variable so as to accordingly improve the determination result.

Before going into more detail about the determination and usage of the correction variable in the context of the method according to the invention, a vehicle 1 is first of all described with reference to FIGS. 2 and 3, which vehicle is equipped with a system for performing the method according to the invention.

FIG. 2 shows a vehicle 1 that has four vehicle wheels W1-W4 in the illustrated example (for example an automobile).

The reference numerals of components that are provided multiple times in one embodiment but have an analogous effect (for example the wheels W1-W4) are numbered consecutively (each supplemented by a hyphen and a consecutive number). Reference is also made below to individual such components or to all of such components by way of the non-supplemented reference numeral.

FIG. 3 shows by way of example a wheel W of the vehicle 1 (FIG. 2), which may be any of the wheels W1-W4 shown in FIG. 2.

The wheel W is formed by an air-filled tire 2 and a rim 3, wherein the tire has a tread 4, symbolized in FIG. 3, having a tread depth td.

During operation of the vehicle 1 having the tire 2, the wheel W rotates about its wheel center 5. The arrow 7 symbolizes this wheel rotation, in which the radially outer end (facing away from the tire) of the tread 4 rolls on the driving surface. The radially inner end of the tread 4, that is to say the tire-side start of the tread 4, is denoted with the reference numeral 6.

A tire load RL exerted by the vehicle 1 on the wheel W and thus the tire 2 brings about a certain deformation of the tire 2 in which, as illustrated in FIG. 3, a more or less large tire footprint is formed between the tire 2 and the driving surface, the length of which footprint is referenced L in FIG. 3.

The wheel W is furthermore equipped with an electronic wheel unit 12 arranged thereon (cf. electronic wheel units 12-1 to 12-4 in FIG. 2), by way of which wheel operating parameters of the wheel W are able to be recorded and corresponding wheel operating data are able to be transmitted to a controller 20 of the vehicle 1 (FIG. 2) in the form of a periodically transmitted radio signal R (cf. radio signals R1-R4 in FIG. 2).

In the illustrated example according to FIG. 2, a tire pressure monitoring system (TPMS) of the vehicle 1 is formed by way of the electronic wheel units 10-1 to 10-4. Accordingly, the electronic wheel units 10-1 to 10-4 record in each case at least the tire pressure p of the vehicle wheel in question of the vehicle wheels W1-W4, and the electronic wheel units 10-1 to 10-4 transmit wheel operating data containing at least one item of information about the tire pressure p to the controller 20 of the vehicle 1.

The electronic wheel units 12-1 to 12-4 are of an identical design and are arranged on an inner side of a tire running surface of the respective tire 2 in the illustrated example.

With reference to FIG. 6, which shows by way of example the design of such an electronic wheel unit 12 (cf. electronic wheel units 12-1 to 12-4 in FIG. 2), each of the wheel units 12 comprises a pressure sensor 14 for measuring the tire pressure p and providing a sensor signal representing the tire pressure p, an acceleration sensor 15 for measuring a radial acceleration a (at the application location of the electronic wheel unit 12) and providing a sensor signal representing this radial acceleration a, and a temperature sensor 16 for measuring a tire temperature T (inside the tire 2) and providing a sensor signal representing this tire temperature T.

Said sensor signals are fed for processing to a program-controlled computer unit 18, the operation of which is controlled by a program code stored in an assigned digital memory unit 17. The computer unit 18 generates the wheel operating data to be transmitted, which are transmitted to the vehicle-side controller 20 in the form of the radio signals R.

The vehicle-side controller 20 is connected for this purpose to a radio receiver 30 for receiving the radio signals R from all of the electronic wheel units 12.

The measurement of the radial acceleration a and provision of the corresponding sensor signal is used in the illustrated example to determine, on the basis of an evaluation of the sensor signal profile, values of an instantaneous rotational speed and/or rotational position of the wheel W in question and to incorporate corresponding information about this into the wheel operating data and thus the radio signals R.

The radio receiver 30 decodes the received data telegrams and forwards the information contained therein to a reception device 21 of the controller 20.

The vehicle 1 is furthermore equipped with a GPS device 8 that is designed to determine position data relating to the current position of the vehicle 1 by receiving and evaluating radio signals from a plurality of satellites S. The GPS device 8 may represent a component of a navigation system that is often provided in any case in modern vehicles and transmits the determined position data and/or a speed v of the vehicle 1 determined therefrom to the reception device 21 of the controller 20.

The vehicle 1 is furthermore equipped with rotational speed sensors 10-1 to 10-4 that are in each case arranged fixed to the vehicle and designed to determine values of the instantaneous rotational speed and/or rotational position of the vehicle wheel in question of the vehicle wheels W1-W4 and to output them to the reception device 21 of the controller 20 in the form of rotational speed sensor data D1, D2, D3 or D4.

The controller 20 furthermore has a program-controlled computer unit 22 and an associated memory unit 28, wherein a program code used to operate the computer unit 22 may in particular be stored in the memory unit 28.

The computer unit 22 of the controller 20 in connection with the mentioned program code in the memory unit 28 at the same time implements the determination devices 23, 24 and 25 denoted symbolically in FIG. 2 and described below with regard to their function.

The operation of the controller 20 for the vehicle 1 in order to determine the tread depth td of the tread 4 of a tire 2 may be described as follows:

The reception device 21 receives the instantaneous rotational speed (for example the angular speed ω) of the wheel W having the tire 2 in question, the instantaneous speed v of the vehicle 1 and at least one operating parameter of the tire, selected from the group consisting of the instantaneous tire temperature T, the instantaneous tire pressure p and the instantaneous tire load RL.

In the illustrated example, the rotational speed is determined based on the rotational speed sensor data D of the rotational speed sensor in question of the rotational speed sensors 10-1 to 10-4. As an alternative or in addition, the radio signal R in question could also be used for this purpose.

The instantaneous speed v of the vehicle 1 is determined based on those data that are determined by the GPS device 8.

To determine the at least one first operating parameter of the tire 2, the electronic wheel unit 12 in question is used in the illustrated example, which wheel unit in this case in particular delivers data relating to the instantaneous tire temperature T and relating to the instantaneous tire pressure p. These data may also for example contain information about the instantaneous tire load RL, which may be achieved in the illustrated example for example in that the instantaneous length L of the tire footprint is first of all determined for example by appropriate evaluation of the sensor signal provided by the acceleration sensor 15, in order to determine the tire load RL therefrom taking into account further parameters (for example in particular the tire temperature T and/or the tire pressure p).

Moving away from this exemplary embodiment, instead of the acceleration sensor 15, a deformation sensor could also for example be used in order to accordingly determine the described parameters L and RL by evaluating the sensor signal profile of the deformation sensor.

The first determination device 23 (here: a first partial functionality of the control program running in the computer unit 22) determines an instantaneous dynamic wheel radius $r1_{dyn}$ of the wheel W having the tire 2 in question based on the received instantaneous rotational speed (here: the angular speed ω) and the received instantaneous speed v of the vehicle 1. This is performed in accordance with the relationship $r1_{dyn} = v/\omega$.

The second determination device 24 (here: second partial functionality of the control program) determines the instantaneous dynamic inside radius $r2_{dyn}$ of the wheel W based on the at least one received first operating parameter (here in particular for example the tire temperature T, the tire pressure p and the tire load RL).

The dynamic inside radius $r2_{dyn}$ may especially for example be determined by determining the dynamic inside radius $r2_{dyn}$ beforehand as the difference between the dynamic wheel radius $r1_{dyn}$ and the defined tread depth $td_0$ (for example $td_{new}$) in the case of a tire having a defined tread depth $td_0$, for example a new tire with a new tread depth $td_{new}$ ($r2_{dyn} = r1_{dyn} - td_0$), and then storing this inside radius $r2_{dyn}$ thus determined at the beginning of the tire life for example for the whole remainder of the tire life as a base value in the controller 20 or its memory unit 28 and, when the method is performed, it is corrected further by the second determination device 24 based on the at least one first operating parameter in order to determine the instantaneous inside radius $r2_{dyn}$.

The third determination device 25 (here: third partial functionality of the control program) determines the tread depth td of the tread 4 of the tire 2 based at least on the determined values $r1_{dyn}$ and $r2_{dyn}$.

One particular feature of the third determination device 25 or of the last tread depth determination is that in this case a correction variable F determined beforehand for the type of tire 2 in question is taken into consideration, which correction variable characterizes the relationship between a change Δtd in the tread depth td, on the one hand, and a change $\Delta(r1_{dyn} - r2_{dyn})$ resulting therefrom in the difference between the dynamic wheel radius $r1_{dyn}$ and the dynamic inside radius $r2_{dyn}$, on the other hand.

This correction variable F, which is described in even more detail below, is stored in the memory unit 28 of the controller 20 in the illustrated example and was determined beforehand by measuring the type of tire in question on a tire test bench.

With regard to the correction variable F, two limit cases of a mathematical physical model of a tire 2 installed for example on the vehicle 1 of FIG. 2 are explained below with reference to FIG. 4 and FIG. 5.

Although this mathematical physical model may explain the significance and the advantage of the consideration, according to the invention, of the correction variable F, the model should in no way be understood as restricting the present invention, but rather merely to be an illustrative explanatory approach for the advantage achieved by way of the invention.

FIGS. 4 and 5, in a schematic side view corresponding to FIG. 3, once again each show the tire 2 in an operating situation, that is to say rolling on a driving surface and in this case loaded by a wheel load RL acting from above. The tread 4 or its tread depth td is illustrated in an excessively large manner in FIGS. 4 and 5 for the sake of improved discernibility.

In addition to a geometric wheel radius r1 and a geometric inside radius r2 (that are able to be measured for example on the unloaded tire 2), an outer circumference U1 (on the outer tread end) and an inner circumference U2 (on the tread start 6) of the tire 2 are also indicated.

FIG. 4 illustrates a case in which the tire 2 has only slight deformation in the region of its contact with the driving surface (tire footprint). In this case, the tire 2 may accordingly roughly be considered to be a circular object, in which circumferential sections 11 (on the outer circumference U1) and 12 (on the inner circumference U1) situated in the contact region between the tire 2 and the driving surface, as illustrated, have different lengths (11>12).

FIG. 5 by contrast shows a case in which, depending on the type of tire, the tire 2 is deformed on the underside in the contact region between the tire 2 and the driving surface to such an extent that the rolling of the tread 4 exhibits a similarity to the rolling of the track of a tracked chassis or of a tracked vehicle (for example tank, bulldozer, snowmobile, etc.).

Using this "tank track" analogy, FIG. 5 indicates two (conceptual) tracked chassis rollers over which the tread 4 of the tire 2 runs like a track of a tracked chassis provided with these rollers.

In this case, the circumferential sections 11 on the outer circumference U1 and 12 on the inner circumference U2 situated in the contact region between the tire 2 and the driving surface are of substantially the same length. This description or this limit case is also referred to below as "tank track limit case".

It is pointed out at this juncture that, in particular depending on the type of tire 2 and on specific operating parameters of the operation of the tire 2 and of the vehicle 1, cases that lie as it were between these two limit cases according to FIG. 4 and FIG. 5 are able to be imagined and are even particularly relevant in practice.

With regard to the dynamic radii, a difference $\Delta r_{dyn}$ with regard to measurements on the outer circumference U1 and inner circumference U2 may be defined as $\Delta r_{dyn} = 11 - 12$.

To determine the tread depth td or a change Δtd in the tread depth td from which the tread depth td is easily able to be determined, however, the geometric radii of the tire 2 or a corresponding difference $\Delta r_{geom}$ is decisive: $\Delta td = \Delta r_{geom}$, wherein $\Delta r_{geom} = r1 - r2$, and wherein r1 denotes the geometric wheel radius and r2 denotes the geometric inside radius of the wheel 2.

In the tread depth determination according to the invention (cf. step S6 in FIG. 1), however, mapping of the dynamic difference $\Delta r_{dyn}$ able to be obtained from the determined values of $r1_{dyn}$ and $r2_{dyn}$ onto the ultimately decisive difference $\Delta r_{geom}$ (= Δtd) may advantageously be performed.

In the limit case of FIG. 4, a change in a geometric radius is linked directly to a change of identical magnitude in the corresponding dynamic radius, giving: $\Delta r_{dyn} = \Delta r_{geom}$.

In the limit case of FIG. 5 (tank track limit case), however, a change $\Delta r_{geom}$ or synonymously a tread depth change Δtd does not result in any corresponding change $\Delta r_{dyn}$ in the dynamic radius. It holds true that $\Delta r_{dyn} = 0$.

This is able to be seen visibly in FIG. 5: In the tank track limit case, a change Δtd in the tread depth td does not bring about a change in the relationship between the rotational speed (for example the angular speed ω) of the tire 2 and the speed v of the vehicle 1. Rather, the value of the tread depth td in this case influences only the vertical distance between the wheel center 5 and the driving surface, but not said relationship.

Based on the above observations, for example according to one particularly simple embodiment, a linear relationship or linear mapping between a dynamic radius or a change in a dynamic radius and the associated geometric radius or the change in the associated geometric radius is able to be assumed, which is able to be expressed, with reference to corresponding differences, by the following relationship:

$$\Delta r_{geom} = F \times \Delta r_{dyn}$$

wherein F represents a correction constant characteristic for the type of tire 2 and that represents the relationship between the difference or change Δtd in the tread depth td, on the one hand, and the corresponding difference or change $\Delta(r1_{dyn}-r2_{dyn})$ resulting therefrom, on the other hand.

In this embodiment, for the case according to FIG. 4, it accordingly holds true that F=1, whereas, for the case according to FIG. 5 (tank track limit case), the correction constant F diverges (F=∞).

In this limit case (FIG. 5), a determination (calculation) of the geometric tread depth change Δtd fails in theory due to a determined change $\Delta(r1_{dyn}-r2_{dyn})$ in the dynamic radius difference $r1_{dyn}-r2_{dyn}$ alone.

In practice, however, it is advantageous, for common tires 2, for the behavior to lie rather between the described limit cases according to FIG. 4 and FIG. 5, such that the limit case F=∞ does not occur in the mentioned linear mapping. In this respect, it is feasible, in the linear mapping, to provide a correction constant F that is finite but that may be considerably greater than 1. In one embodiment, the correction constant is selected so as to lie in the range from 2 to 4.

Independently of this, in practice, in the tread depth determination according to the invention based on the determined instantaneous dynamic wheel radius $r1_{dyn}$ and the determined instantaneous dynamic inside radius $r2_{dyn}$, there may be provision to determine the tread depth td in the case of which td is not determined exclusively depending on the difference $r1_{dyn}-r2_{dyn}$, but rather one or more further variables of the type already described, in particular operating parameters of the tire 2 in question and/or of the vehicle 1 in question, are taken into consideration or jointly taken into consideration.

There may thus for example be provision for the tread depth td to be determined, as an alternative or in addition to the mentioned dependency on the difference $r1_{dyn}-r2_{dyn}$, depending on the dynamic wheel radius $r1_{dyn}$ and/or the dynamic inside radius $r2_{dyn}$.

As an alternative or in addition, further variables such as in particular for example operating parameters of the vehicle operation (for example the speed v of the vehicle 1) and/or operating parameters of the tire operation (for example the tire temperature T, the tire pressure p and/or the tire load RL) may be provided as variables, on which the result of the tread depth determination depends.

As an alternative to using the correction constant, a correction function F1, characteristic at least for the type of tire 2, for mapping the difference $r1_{dyn}-r2_{dyn}$ onto a tread depth change Δtd may also be used as the correction variable F.

In this embodiment, for example a change $\Delta r_{geom}$ in the geometric radius (and accordingly a geometric change Δtd in the tread depth td) may be calculated as value of the function F1 that depends at least on the change $\Delta r_{dyn}$ in the dynamic radius: $\Delta r_{geom} = F1(\Delta r_{dyn})$.

Such a mapping function F1 is able to be stored, for example by way of one or more characteristic curves (for example a lookup table), in a memory device of the system used to perform the method according to the invention.

LIST OF REFERENCE SIGNS 1 vehicle
v speed of the vehicle
W1 to W4 wheels of the vehicle
ω angular speed of the wheel
2 tire
RL tire load
3 rim
L length of the tire footprint
4 tread of the tire
td tread depth
5 wheel center
6 start of the tread
7 wheel rotation
S satellites
8 GPS device
10-1 to 10-4 rotational speed sensors
D1 to D4 rotational speed sensor data
12-1 to 12-4 electronic wheel units
R1 to R4 radio signals
14 pressure sensor
p pressure
15 acceleration sensor
a radial acceleration
16 temperature sensor
T tire temperature
17 memory unit
18 computer unit
19 radio transmitter
20 controller
21 reception device
22 computer unit
23 first determination device
24 second determination device
25 third determination device
28 memory unit
30 radio receiver
U1 outer circumference
11 circumferential section (on outer circumference)
r1 geometric wheel radius
$r1_{dyn}$ dynamic wheel radius
U2 inner circumference
12 circumferential section (on inner circumference)
r2 geometric inside radius
$r2_{dyn}$ dynamic inside radius

The invention claimed is:

1. A method for determining a tread depth of a tread of a tire during operation of a vehicle comprising the tire, comprising:

determining an instantaneous rotational speed of a wheel, comprising the tire, of the vehicle based on data determined by at least one first sensor, determining an instantaneous speed of the vehicle based on data determined by at least one second sensor different from the at least one first sensor, determining an instantaneous dynamic wheel radius of the wheel comprising the tire, based on the determined instantaneous rotational speed and the determined instantaneous speed of the vehicle, determining at least one first operating parameter of the tire, selected from the group consisting of an instantaneous tire temperature, an instantaneous tire pressure and an instantaneous tire load, determining an instantaneous dynamic inside radius of the wheel based on the at least one determined first operating parameter, wherein the inside radius of the wheel is the distance between the wheel center and the tire-side start of the tread, determining a tread depth of the tread of the tire based on the determined instantaneous dynamic wheel radius and the determined instantaneous dynamic inside radius, wherein the tread depth is determined based at least in part on a correction variable predetermined for the type of tire, wherein the correction variable characterizes the relationship between a change in the tread depth and a change resulting therefrom in the difference between the dynamic wheel radius and the dynamic inside radius.

2. The method as claimed in claim 1, wherein a correction constant characteristic to the type of tire is used as the correction variable, which correction constant represents the relationship between the change in the tread depth and the change resulting therefrom in the difference between the dynamic wheel radius and the dynamic inside radius.

3. The method as claimed in claim 1, wherein a correction function, characteristic to the type of tire, configured to map a difference between the dynamic wheel radius and the dynamic inside radius onto a change in the tread depth is used as the correction variable.

4. The method as claimed in claim 3, wherein the function value of the correction function additionally depends on at least one function parameter, selected from the group consisting of the speed of the vehicle, the tire temperature, the tire pressure and the tire load.

5. The method as claimed in claim 1, wherein the tread depth is determined utilizing at least one characteristic curve stored in a memory device.

6. The method as claimed in claim 1, wherein at least one second operating parameter is additionally determined, the second operating parameter being selected from the group consisting of an instantaneous acceleration of the vehicle, an instantaneous yaw rate of the vehicle, an instantaneous steering angle, an instantaneous torque of a drive motor of the vehicle and an operating state of a braking device of the vehicle, and wherein the tread depth is additionally determined depending on the at least one determined second operating parameter.

7. The method as claimed in claim 1, wherein the at least one first sensor is configured as a rotational speed sensor.

8. The method as claimed in claim 1, wherein the at least one second sensor is selected from the group consisting of a satellite-assisted position determination sensor, a radar sensor, a lidar sensor, an ultrasound sensor and an optical camera.

9. The method as claimed in claim 1, wherein the instantaneous dynamic inside radius is additionally determined based on the determined instantaneous speed of the vehicle or additionally determined based on the type of tire or an age of the tire.

10. The method as claimed in claim 1, wherein the instantaneous dynamic inside radius is determined utilizing at least one characteristic curve stored in a memory device.

11. A computer program product comprising a program code that, when executed on a data processing device, performs a method as claimed in claim 1.

12. A controller for a vehicle for determining a tread depth of a tread of a tire of the vehicle, comprising:

a reception device, configured to receive an instantaneous rotational speed of a wheel, comprising the tire, of the vehicle, an instantaneous speed of the vehicle and at least one first operating parameter of the tire, selected from the group consisting of an instantaneous tire temperature, an instantaneous tire pressure and an instantaneous tire load, a first determination device, configured to determine an instantaneous dynamic wheel radius of the wheel comprising the tire based on the received instantaneous rotational speed and the received instantaneous speed of the vehicle, a second determination device, configured to determine an instantaneous dynamic inside radius of the wheel based on the at least one received first operating parameter, wherein the inside radius of the wheel is the distance between the wheel center and the tire-side start of the tread, and a third determination device, configured to determine a tread depth of the tread of the tire based on the determined instantaneous dynamic wheel radius and the determined instantaneous dynamic inside radius, wherein the third determination device is configured to determine the tread depth based at least in part on a correction variable predetermined for the type of tire, wherein the correction variable characterizes the relationship between a change in the tread depth and a change resulting therefrom in the difference between the dynamic wheel radius and the dynamic inside radius.

13. A system for a vehicle for determining a tread depth of a tread of a tire of the vehicle, comprising a controller as claimed in claim 12 and at least one electronic wheel unit, wherein the at least one electronic wheel unit is able to be arranged in the tire and comprises at least one sensor selected from the group consisting of a temperature sensor, a pressure sensor, an acceleration sensor and a deformation sensor.

* * * * *